United States Patent Office.

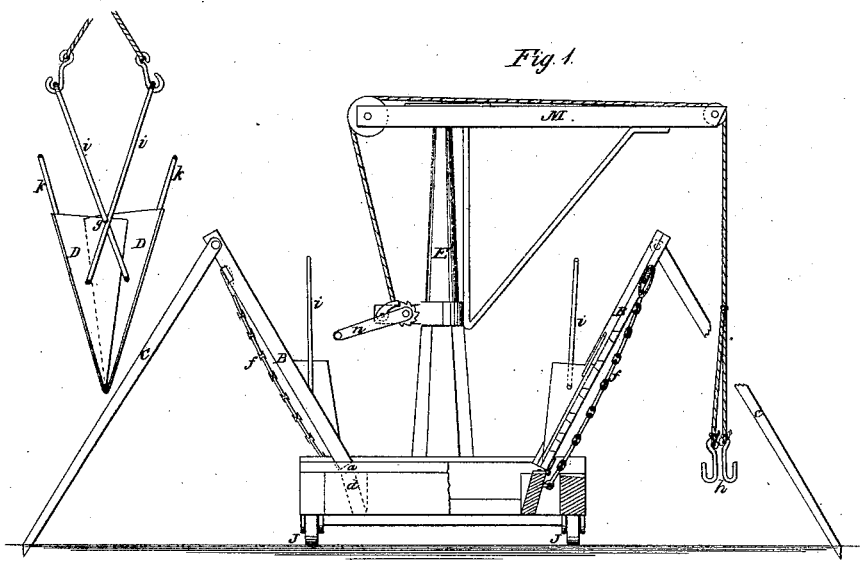

GEORGE SULLIVAN, OF WEST LIBERTY, OHIO.

Letters Patent No. 61,114, dated January 8, 1867.

IMPROVED DITCHING MACHINE.

*The Schedule referred to in these Letters Patent and making part of the same.*

TO ALL WHOM IT MAY CONCERN:

Be it known that I, GEORGE SULLIVAN, of West Liberty, in the county of Logan, and State of Ohio, have invented a new and useful improvement in Ditching Machines; and I do hereby declare that the following is a full, clear, and exact description thereof, which will enable others skilled in the art to make and use the same, reference being had to the accompanying drawings forming part of this specification.

My invention consists in forming a machine in such a manner that spades of a peculiar form can be forced into the ground at any desired angle, and a quantity of earth taken up by the spades being attached to a crane and the earth deposited in any desired position by swinging the crane and loosening the fastenings.

Figure 1 represents an end elevation of the machine through the line $x\ x$ of fig. 2, partly in section, showing the guide timbers and braces, and also the crane; likewise a side view of the spades or excavators on the guides with their bails attached.

Figure 2 is a plan or top view.

Figure 3 is a view of the spades attached and locked together as they are when raised from the ditch.

Figure 4 is a view of the lever by which the spades are forced into the ground.

Similar letters of reference indicate like parts.

A represents the frame or foundation which sustains the guide frames, and also upon which the crane rests. B represents the inclined guide frames; C the braces which govern the position of the guide frames; D the spades or excavators; E the windlass and crane.

The frame A is rectangular in shape, mounted on truck-wheels, so that it can be moved along to accommodate the work, and also for transportation from place to place. It is formed of substantial outside timbers and with cross-timbers to support the crane and to keep the bottom ends of the guide frames in their proper places. The guide frames consist each of two side timbers, with a rail, $b$, at the upper part. At the bottom they are attached to the longitudinal timbers $d$ by hinges $a$. These timbers are movable and can be made to slide towards the centre, so as to bring the lower ends of the guide frames near together when desired to alter the working angle of the spades. The side timbers of these guide frames are rabbeted out at the upper inside corner, so as to form ways and guides for the spades to slide in. At the lower part of the rabbeted portion there is a groove on the inside to admit a lip or flange which extends from the bottom plate of the spade. This is for the purpose of keeping the spades in place while they are being forced into the earth. These spades are made something in the shape of a road scraper, but of iron or steel, or both, the bottom being of nearly a square form, with bails attached to their sides. $i$ shows the bails. The iron frames of the spades extend up above the bottom, as seen at $k$, supported in the middle by a stud, $o$. The lever operates upon this bar in forcing the spade into the ground. Attached firmly to the timbers $d$ there are chains $f$, which extend upward and are attached to the cross-piece $b$. The spades are forced into the ground by the lever, fig. 4, working in the links of these chains and on the top of the spades. A great force is thus exerted on the spades by the purchase thus obtained. The spades are forced into the ground at an angle determined by the position of the guide frames, and the angle of the guide frames is governed by the position of the braces C. When the spades are driven home the ends or edges meet at the bottom of the ditch, and when they are raised they bring up a triangular-shaped piece of earth, leaving a ditch pointed or angular at the bottom. It will be noticed that there are hooks on the sides of one of the spade bails, seen at $g$, fig. 3. When the spades are ready to be raised from the ditch, the other bail is passed over this one and below the hooks $g$. The windlass rope or chain is now attached by the hooks $h$ to the bail, and the spades containing the earth are raised by the windlass. The crane is now swung round to wherever it is desired to leave the earth. When the spades and earth are lowered and rest upon the ground, the bail under the hooks is easily detached as soon as the rope is slackened. The ends of the bails are brought together, and when they are raised in this position the spades leave the earth which they have brought up on the ground. It will be noticed that there is a small loose hook on one of the bails. The two bales are held together by this hook until they are ready to enter the ways again for another operation. When it is desired to alter the width of the ditch, the timbers $d$ (to which the guide frames are attached) are moved either from or towards the centre, while the braces C are set so that the guide frames govern the angle of the cut and the ditch. J represents the truck-wheels under the frame A. The windlass-crane E is firmly set upon and attached to the frame A, the pillar being stationary and the windlass revolving around the pillar with the arm $m$ of the crane. $n$ is the crank of the windlass.

Having thus described my invention, what I claim as new, and desire to secure by Letters Patent, is—

A ditching machine constructed, arranged, and operating as herein shown and described.

I claim the windlass and crane in combination with the inclined guide frames, substantially as described.

GEORGE SULLIVAN.

Witnesses:
R. N. JORDAN,
JOHN SALSBURY.